United States Patent [19]
Padden et al.

[11] Patent Number: 4,979,206
[45] Date of Patent: Dec. 18, 1990

[54] DIRECTORY ASSISTANCE SYSTEMS

[75] Inventors: Frederick W. Padden, Wheaton; Werner Ulrich, Glen Ellyn, both of Ill.

[73] Assignee: AT&T Bell Laboratories, Murray Hill, N.J.

[21] Appl. No.: 409,973

[22] Filed: Sep. 18, 1989

Related U.S. Application Data

[63] Continuation of Ser. No. 72,078, Jul. 10, 1987, abandoned.

[51] Int. Cl.$^5$ ............... H04M 3/54; H04M 1/64; H04M 3/60
[52] U.S. Cl. ............... 379/67; 379/213; 379/88; 379/84; 379/74
[58] Field of Search ............... 379/67, 68, 70, 79, 379/77, 80, 84, 88, 89, 213

[56] References Cited

U.S. PATENT DOCUMENTS

Re. 32,012 10/1985 Pirz et al. ............... 381/43
4,341,929 7/1982 Alexander et al. .
4,475,013 10/1984 Lee et al. .
4,488,005 12/1984 Frantz ............... 379/88
4,608,460 8/1986 Carter et al. .

FOREIGN PATENT DOCUMENTS 3231835 3/1984 Fed. Rep. of Germany .
3422409 12/1985 Fed. Rep. of Germany .
149253 8/1985 Japan .

OTHER PUBLICATIONS

B. Aldefeld et al., "Automated Directory Listing Retrieval System Based on Isolated Word Recognition", *Proceedings of the IEEE*, v. 68, No. 11, Nov. 1980, pp. 1364-1379.
Smits, C. M., "Telephone Management Functions", *Philips Telecommunication Review*, vol. 43, No. 2, Jun. 1985, pp. 172-181.
Picture, *Chicago Tribune*, Jun. 13, 1987.
S. D. Hester et al., "The AT&T Multi-Mode Voice Systems-Full Spectrum Solutions for Speech Processing Applications", *Proceedings of the 1985 AVIOS Conference*.
J. P. Maury, "The Electronic Directory Service", *Commutation & Transmission* 5, No. 5, Dec. 1982, pp. 31-42.
*Answer Attack Phone*, by DAK Industries Incorporated, Stereo Review, Jul. 1986, p. 139.

*Primary Examiner*—Stuart S. Levy
*Assistant Examiner*—James E. Tomassini
*Attorney, Agent, or Firm*—Werner Ulrich; Fred W. Padden

[57] ABSTRACT

An arrangement for obtaining directory assistance automatically and without the assistance of an operator. A customer requesting directory assistance is connected to an automatic speech recognition unit (ASRU) and is prompted to speak commands for identifying the requested directory number. The ASRU converts received speech signals from the customer into data signals for searching a directory number data base. If a directory listing is located, the number of that listing is announced to the customer and the customer is automatically prompted to speak a command indicating whether a call to that number should be automatically established. The telecommunications switching network responds to a positive command by automatically establishing such a connection. Advantageously, such an arrangement provides directory assistance service automatically without requiring special customer equipment.

2 Claims, 6 Drawing Sheets

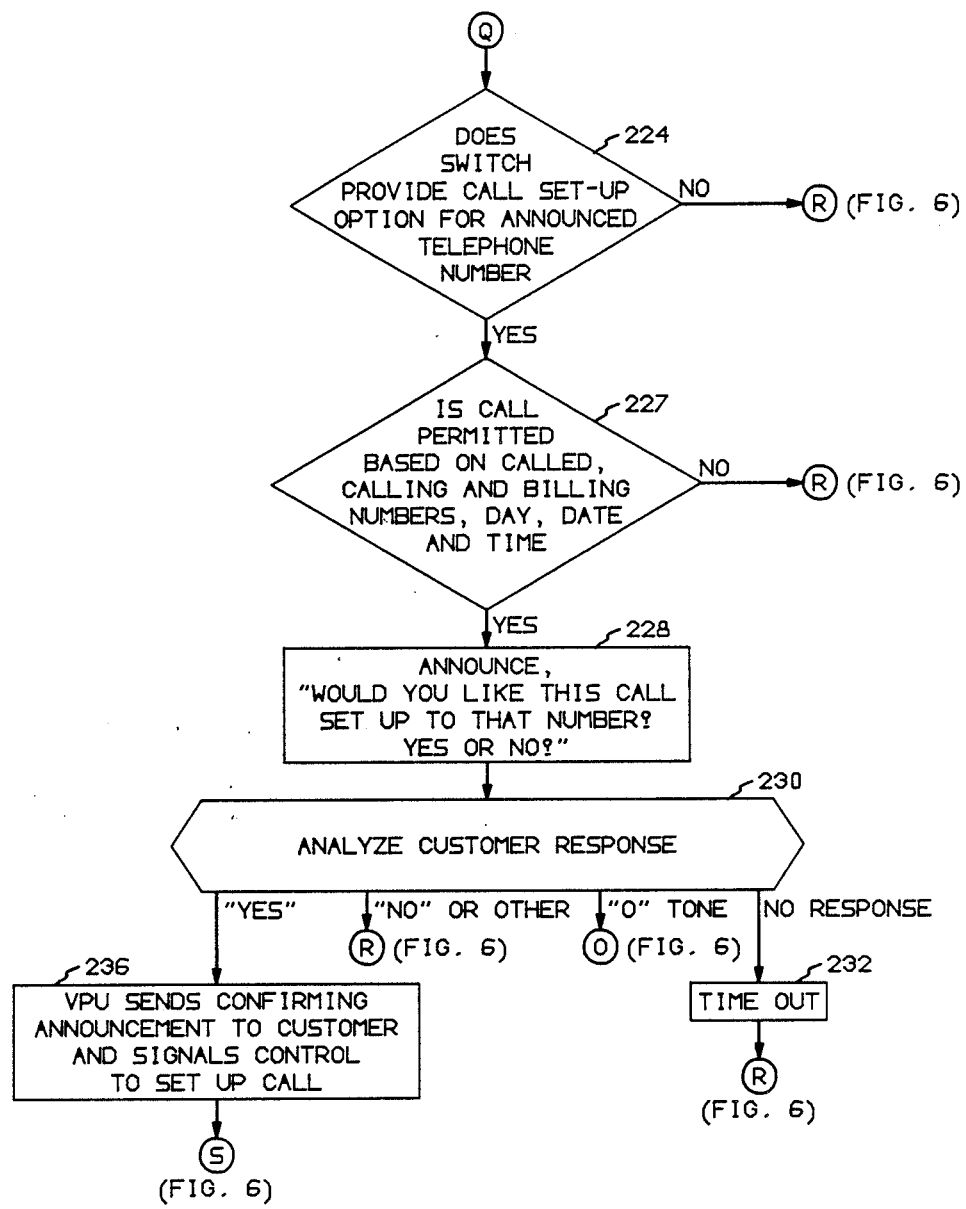

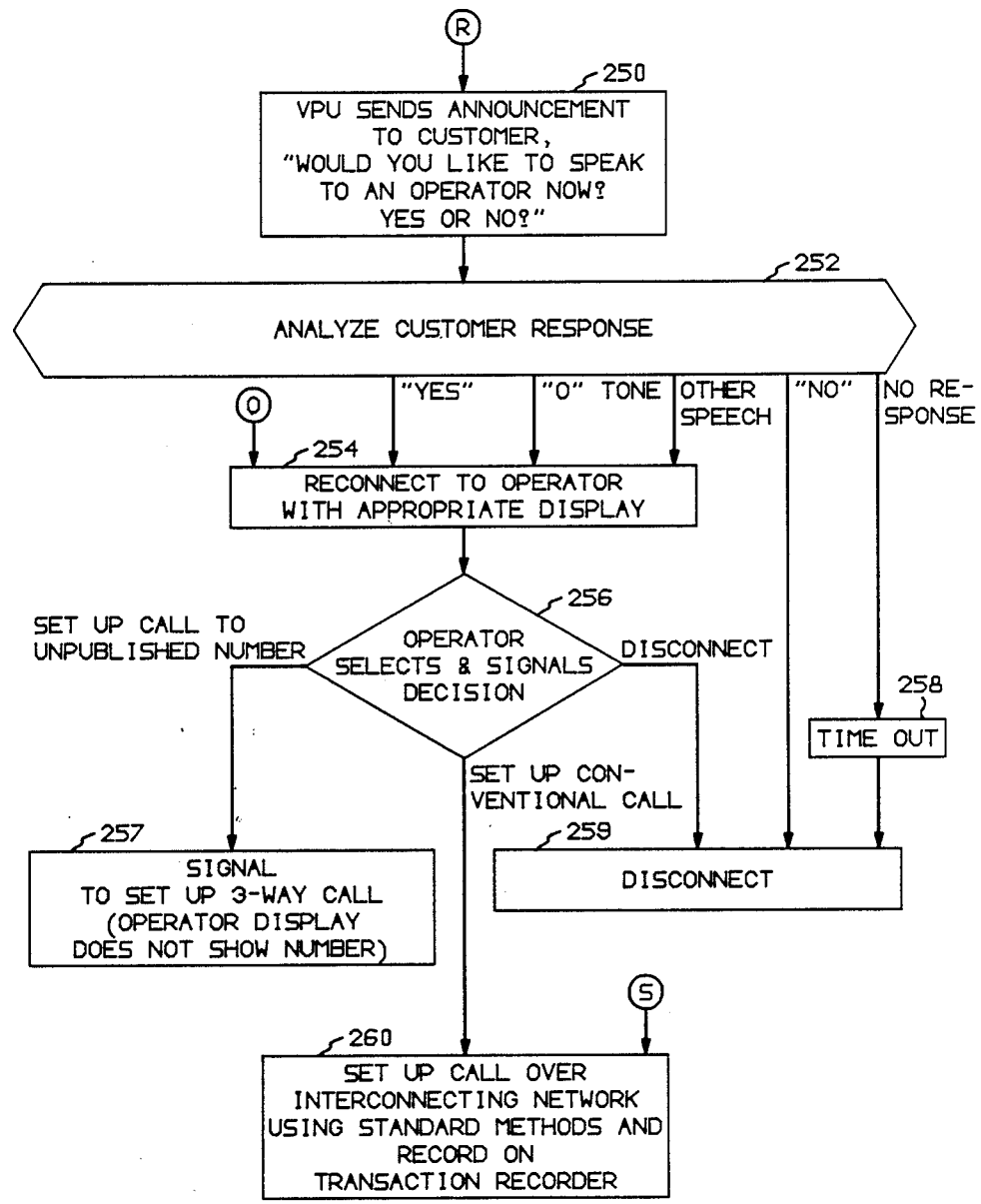

DIRECTORY ASSISTANCE SYSTEMS

This application is a continuation of application Ser. No. 072,078, filed on July 10, 1987, now abandoned.

TECHNICAL FIELD

This invention relates to systems for automatic processing of directory assistance calls.

PROBLEM

Many present day directory assistance systems use a computer-aided search arrangement. In such a system, a customer places a call to an operator and gives the particulars of a request for a directory listing and the operator keys identifying data into a computer for locating directory listings. When the operator has found an apparently correct listing in a computer generated display of listings, the operator signals the identity of the correct listing in the display and disconnects from the directory assistance call. The listing is then automatically announced to the calling telephone customer. A pending application Ser. No. 916,615, submitted by A. N. Daudelin on Oct. 8, 1986 and assigned to the assignee of this patent application, further discloses arrangements for automatically setting up a telephone call to the telephone line corresponding to a listing found by a directory assistance operator.

A problem in offering such assistance is that a substantial amount of operator time, customer and switching equipment time is required. The operator time involves communicating with the caller and keying identifying data into the directory assistance computer. The caller awaits the computer-directed voice response of the identified directory number and then terminates the directory assistance call only, in many cases, to originate a new call through the switching equipment to that directory number.

SOLUTION

The above problem is solved and an advance is made in the art in accordance with our invention wherein a call for directory assistance is processed in response to voice frequency instructions from the caller without operator intervention. The instructions are used by an automatic speech recognition unit to generate data signals corresponding to recognized voice frequency signals. The data signals are then used to search a data base for a directory listing to derive the desired directory number. The caller instructs the directory assistance system equipment to automatically set up a call to the destination corresponding to that listing, advantageously, without the need for the caller to terminate the directory assistance call and reinitiate a new call. Indeed, this call processing reduces customer time and switching equipment call processing time, and eliminates any need for operator involvement.

Illusratively, a switching system adapted to offer directory assistance service is advantageously equipped with an automatic speech recognition facility for interpreting a spoken or keyed customer request comprising data for identifying a directory listing. In response to recognition of data conveyed by the request, the system searches a data base to locate the directory number listing corresponding to the request. This listing is then automatically announced to the requesting customer.

In accordance with this embodiment of the invention, the calling customer (caller) receives a prompting announcement requesting that the caller provide the zip code or spell the name of the community of the desired directory number. The caller is also prompted to spell the last name of the customer corresponding to the desired directory number. If further data is required, the caller is prompted to spell the first name and street address of the desired party. Following responses to prompting announcements, a search is made to determine if only one listing corresponds to the data supplied by the caller. When this occurs, the directory number is announced to the caller. Advantageously, such an arrangement requires a minimum of speech recognition capability by the speech recognition facility since only letters of the alphabet and numbers need to be recognized.

In this embodiment of the invention, the caller has a choice of dialing one of two different directory assistance numbers. If the caller dials the first of these numbers, then a directory assistance call is set up to announce the directory listing and the caller is then given the option of speaking or keying a command to request that the call be set up to the desired directory number. If the caller dials the other of these directory assistance numbers, a call is automatically set up to the directory number in the identified listing.

DRAWING DESCRIPTION

FIG. 1 is a block diagram of a telecommunications switching system and auxiliary facilities adapted to offer directory assistance service, including a control unit and a voice processing unit (comprising a speech recognition facility), both shown in heavy outlines to indicate that these units include modifications over the prior art to practice the present invention; and FIGS. 2–6 are flow charts of a method for controlling such a switching system to offer directory assistance service automatically and to automatically set up a connection to a customer at the requested directory number.

DETAILED DESCRIPTION

Figure 1:
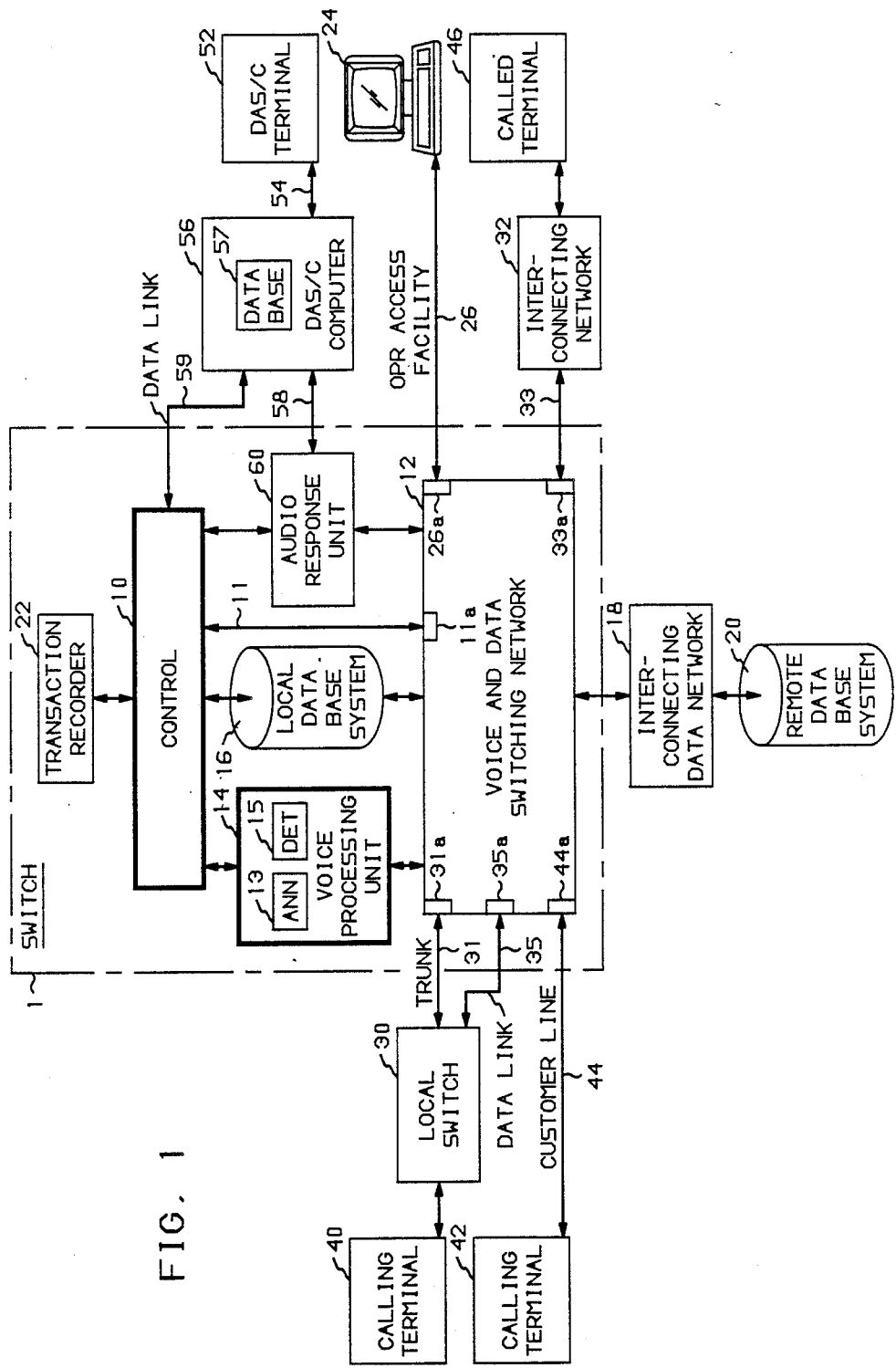
Figure 2:
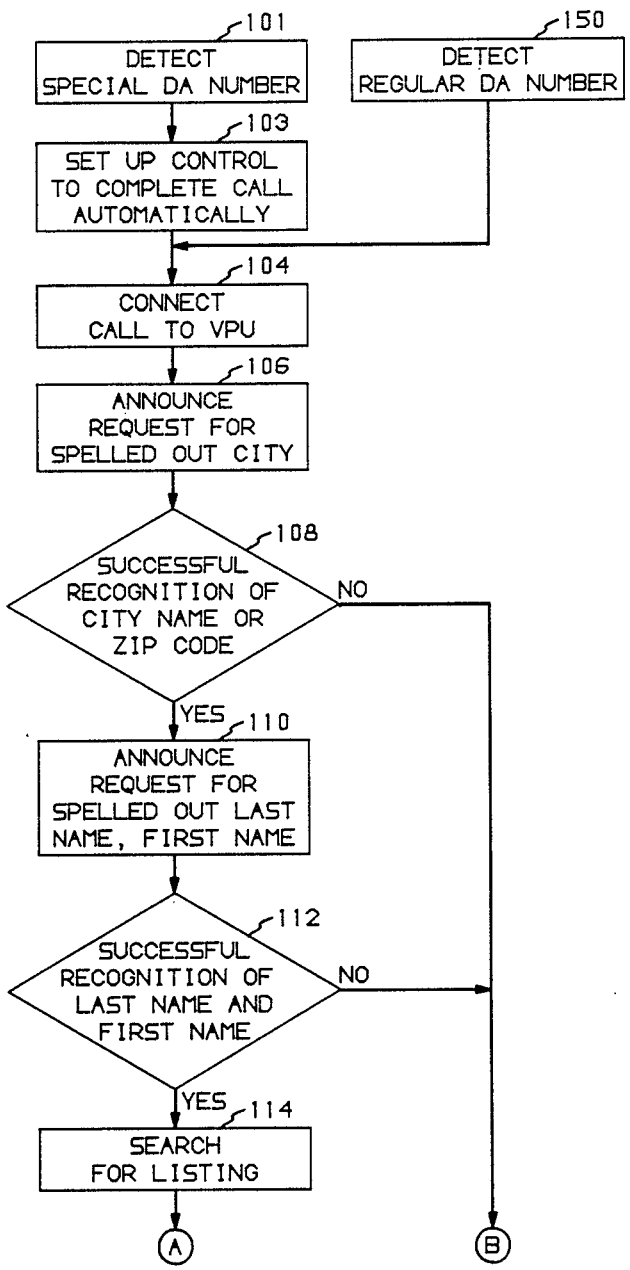

In FIG. 1, block 1 represents a telecommunications switching system, or switch, operating under stored program control and having within it the elements necessary for practicing the invention. Switch 1 is a switch such as the 5ESS SM switch manufactured by AT&T Technologies, Inc., arranged to offer the Operator Services Position System (OSPS) features. The 5ESS switch is described, for example, in AT&T Technical Journal, v. 64, no. 6, part 2, pp. 1305–1564, and the OSPS feature is described, for example, in Paper 3, Session 22C presented at the International Switching Symposium in Florence, May 1984.

Shown within switch 1 are various blocks for carrying out the functions of a telecommunications switch. Control 10 is a distributed control system operating under the control of a group of data and call processing programs to control various blocks of switch 1. Block 12 is a voice and data switching network capable of switching voice and/or data between inputs connected to that switching network. Connected to network 12 is voice processing unit (VPU) 14. Network 12 and VPU 14 operate under the control of control 10. Trunks 31 and 33, customer line 44, data link 35, and operator access facility 26 are connected to network 12 at input ports 31a, 33a, 44a, 35a, and 26a respectively, and control 10 is connected to network 12 via data channel 11 at input port 11a. In order to practice the present invention for directory assistance systems, programs of control 10 for controlling this switching system must be augmented by programs described in the flow charts of FIGS. 2-6.

VPU 14 receives speech or customer keyed information from callers at calling terminals 40 or 42 and processes the voice signals or keyed tone signals from a customer station using well-known automatic speech recognition techniques to generate data corresponding to the speech or keyed information. These data are used by directory assistance system computer (DAS/C) 56 in making a search for a desired telephone or directory number listing. Assume for the primary example of this description, that a directory assistance request comes from customer terminal 42 via customer line 44, port 44a, and switching network 12 to VPU 14. VPU 14 analyzes voice input signals to recognize individual ones of various elements corresponding to a predetermined list of spoken responses. VPU 14 also generates voice messages (announcements) to prompt a caller to speak information into the system for subsequent recognition by the voice processing unit. VPU 14 generates output data signals, representing the result of the voice processing. These output signals are sent to control 10 whence they may be transmitted via data link 59 to DAS/C computer 56; or be used within control 10 as an input to the program of control 10 for controlling establishment of connections in switching network 12, or requesting further announcements by VPU 14. Voice processing unit 14 includes announcement circuits 13 and detection circuits, i.e., automatic speech recognition circuits, 15 both controlled by a controller of VPU 14. In alternate configurations, the announcement and detection circuits could be separate and separately controlled. The Conversant SM 1 Voice System, Model 80, manufactured by AT&T Technologies, Inc., is the unit used in this exemplary embodiment to carry out the functions of voice processing unit 14.

DAS/C computer 56 comprises an extensive data base 57 and is used for making the searches of that data base to locate requested directory listings. The DAS/C computer is connected via data link 58 to an audio response unit (ARU) 60, which is connected to the voice and data switching network 12, for announcing the telephone number of an identified telephone listing. The DAS/C computer used in this exemplary embodiment is manufactured by Computer Consoles, Inc. (CCI) who also manufactures the audio response unit 60 and the DAS/C terminal 52. In this embodiment, DAS/C computer 56 is directly connected to control 10 by data link 59. Alternatively, DAS/C computer 56 could be connected to control 10 via a link to network 12 and a connection through network 12 via port 11a.

DAS/C 56 responds to data received from voice processing unit 14 by providing the requested directory listing information or by requesting additional information to further narrow a choice among a plurality of possible directory listings. If a directory listing is found, the directory number is reported to audio response unit 60 for announcement to the caller, or, if the caller dials a special code, is directly used for setting up a call to that directory number. If additional information is needed, the request for that additional information is sent back via control 10 to voice processing unit 14. VPU 14 then prompts the caller at terminal 42 to provide more information (such as the spelling of a street name). In response to receipt of such further information, VPU 14 analyzes the input signals representing this information and generates further data for transmission to the DAS/C computer 56. In the event that the caller does not or cannot provide adequate recognizable information to VPU 14, control 10 requests that a connection be set up to an operator position such as operator position 24 so that an operator, interacting with the DAS/C computer via a DAS/C terminal 52 and a connecting data link 54, can find the requested directory listing as discussed infra. FIGS. 2-6 are flow charts for the interactions between the calling customer, operator, and voice processing unit 14, and the programs that respond to these interactions.

Directory assistance calls can also be processed with the help of an operator if the VPU fails to recognize adequate oral information, and calls can be set up to the requested directory number automatically if the caller so requests. These further arrangements will now be described. Input communication links to the switching network are connected at input ports identified by the number of the connected input with the letter "a" appended. Connected to switch 1 are trunks 31 and 33 connected to local switch 30 and interconnection network 32. Local switch 30 is connected to calling customer terminal 40 and interconnection network 32 is connected to a called customer terminal 46. Switch 30 and network 32 connect customer terminal signals from customer terminals to switch 1. Also connected to switch 1 are customer lines, including customer line 44, for connecting a customer terminal 42 to switch 1. The word "terminal" as used herein includes the following: a simple customer telephone station, a customer station with more elaborate features such as magnetic strip card readers, or a customer voice/data terminal.

In an alternate connection, calling terminal 40 is connected via local switch 30 to switch 1. In a more general case, other switches forming part of a larger public telephone network such as interconnection network 32 would be required to connect calling terminal 40 to switch 1. Speaking generally, calls are connected to switch 1 via communication links such as trunks 31 and 33, and customer line 44. In the alternate connection, calling terminal 40 is connected by a customer line to a 1A ESS SM switch 30, manufactured by AT&T Technologies, Inc., and used here as a local switch, and that switch is connected to trunk 31 which is connected to switch 1. Local switch 30 is also connected to switch 1 by a data link 35 used for conveying common channel signaling messages between these two switches. Such common channel signaling messages are used herein to request switch 30 to initiate the setting up of a connection, for example, between customer terminals 40 and 46. Switch 1 is connected in the example terminating connection to called terminal 46 via interconnection network 32. If the calling terminal is not directly connected to switch 1, the directory number of the calling terminal, identified, for example, by automatic number identification, is transmitted from the switch connected to the calling terminal to switch 1.

Operator position terminal 24 connected to switch 1 comprises a terminal for use by an operator in order to provide operator assistance. Data displays for the operator position terminal 24 are generated by control 10. Operator position terminal 24 is connected to switching network 12 by operator access facility 26, which may include carrier facilities to allow the operator position to be located far from switching network 12 or may be a simple voice and data access facility if the operator positions are located close to the switching network.

Only one operator position including the two terminals 24 and 52 is shown in FIG. 1 but it is understood that a typical switch, arranged to offer directory assistance service, has access to a large number of such operator positions.

In order to handle directory assistance service, the directory assistance operator has access to two separate operator terminals: terminal 24 for communicating with the caller and switch 1 and terminal 52 used for communicating via data link 54 with DAS/C computer 56. The operator at terminals 24 and 52 communicates orally with a caller and on the basis of these communications keys information into the DAS/C terminal 52 for transmission to the DAS/C computer 56. The DAS/C computer 56 responds to such keyed information by generating displays of information on DAS/C terminal 52 which information may include the desired directory number. Until the caller gives enough information to locate a valid listing, the caller is not connected to an audio response unit since there is nothing to announce. However, when the operator ascertains from oral communications with a caller that the desired number or listing has been displayed, the operator signals to the DAS/C computer with additional keyed information to identify the correct listing and a directory number or a statement that the number is not published is then announced to the caller through the audio response unit, the operator in the meantime being dropped from the connection. In an alternative embodiment, terminals 24 and 52 are a single terminal and the DAS/C computer is accessed via the operator access facility 26 and network 12, and the audio response unit (ARU) 60, which is combined with voice processing unit 14, is accessed by DAS/C via network 12.

Directory numbers are announced from VPU 14 or from an announcement unit 60, available in present directory assistance systems, which has been designed to work cooperatively with a DAS/C computer 56. A voice processing system such as the previously mentioned Conversant system can perform both the monitoring and the announcement functions so that in an alternative configuration, units 60 and 14 of FIG. 1 are merged into a single voice processing system. As shown, unit 14 comprises announcement circuits 13 for making prompting or other announcements to the caller. Further, for some cases, it is more convenient to provide the directory announcement from unit 14 since a connection between a caller and that unit is already established.

After a directory listing has been announced to calling terminal 44, this terminal is connected via switching network 12 to VPU 14 to return an announcement asking whether the caller wishes to be connected to that directory number. VPU 14 then checks for a response from the caller which can be either in the form of a spoken "yes" or a keyed DTMF signal to indicate that the caller wants such a connection to be established. If so, or if the caller had dialed a special number indicating that he wished to have a call set up to the number in the directory listing, a connection is set up through switching network 12 using interconnecting network 32 to reach called terminal 46 wherein called terminal 46 is a terminal corresponding to the listed directory number. A record of the call is made in transaction recorder 22 under the control of control 10 to allow the call to be billed. The identification of the calling terminal 42 was previously transmitted to control 10 at the time the directory assistance request entered switch 1.

In accordance with the prior art, calls for directory assistance service are routed to an operator located in the geographic area of the telephone listing. However, neither the calling number nor the billing number are available at such a distant directory assistance office. Since both of these numbers are necessary to make a record of calls for future billing, calls cannot be set up from such a distant office under present arrangements. However, both of these numbers are available at the operator services office in the caller's originating region. The caller's own directory number or billing number has previously been transmitted over interconnecting network 30 using automatic number identification techniques to identify the calling terminal of a caller not served by switch 1, or obtaining the billing number of a caller served by switch 1 from the local data base 16. These numbers are used at the switch serving the caller or at switch 1 to record message accounting information for billing for the directory assistance call. In switch 1, transaction recorder 22 is used for making records to bill callers for directory assistance service, or, in accordance with an advance over the prior art, to bill the caller for the call set up in response to the caller's subsequent request to set up a call to the retrieved directory number. The call can be set up using the link from switch 1 back to calling customer terminal 40 and continuing the connection from switch 1 to called customer terminal 46. Alternatively, a message can be sent back to switch 30 to set up a connection from switch 30 to called terminal 46 using the normal route for a dialed call from calling terminal 40 to called terminal 46.

FIGS. 2-6 are flow charts describing the method of providing directory assistance in accordance with the principles of this invention. Consider first the case where a caller dials a special directory assistance code such as 311 or 555-1234 which requests the completion of the call. An incoming directory assistance (DA) call with that special number is detected at a combined local/directory number switch 1, for example, at port 44A by voice and data switching network 12 under the control of control 10 (action box 101). (Alternatively, if the call is from a caller connected to a separate switch such as switch 30, the call is connected from the separate switch to switch 1 and the special directory number is detected, for example, at port 31A by the voice and data switching network 12 under the control of control 10.) The control of the system is set up to retain the information that the call is to be completed automatically (action box 103). The call is then connected through network 12 to voice processing unit 14 (action box 104). VPU 14, using announcement unit 13, announces a request to the caller to spell out the city name or zip code of the target customer whose directory number is being requested (action box 106). Alternatively, a PBX, or a city, or other geographic region could be recognized implicitly, i.e., because only the callers of that city or PBX have access to that directory assistance system, or explicitly by having callers dial different numbers for directory assistance for different geographic entities. If an appropriate city name or zip code is successfully recognized by VPU 14 ("yes" output of test 108) then an announcement is sent to the caller requesting that the caller spell the last name, say "comma", and spell the first name of the target customer (action block 110). If there is a successful recognition of a last name and first name ("yes" output of test 112) then a data message is sent from voice processing unit 14 via control 10 and data link 59 to DAS/C computer 56 to request a search for a directory listing corresponding to the spelled out name and city or zip code (action box 114). If the DAS/C computer 56 finds a single listing corresponding to this information ("yes" output of test 116, FIG. 3) then DAS/C computer 56 transmits a data message over data link 59 to control 10 specifying that listing.

If the caller dials the regular directory assistance number such as 411 or 555-1212, this is also detected at the directory assistance system (action block 150). Thereafter, the actions performed for the call are the same as previously described with respect to action blocks 104 et seq., except that the control is not set up to complete the call automatically. This will subsequently affect the result of test 202 (FIG. 4) described infra.

Figure 3:
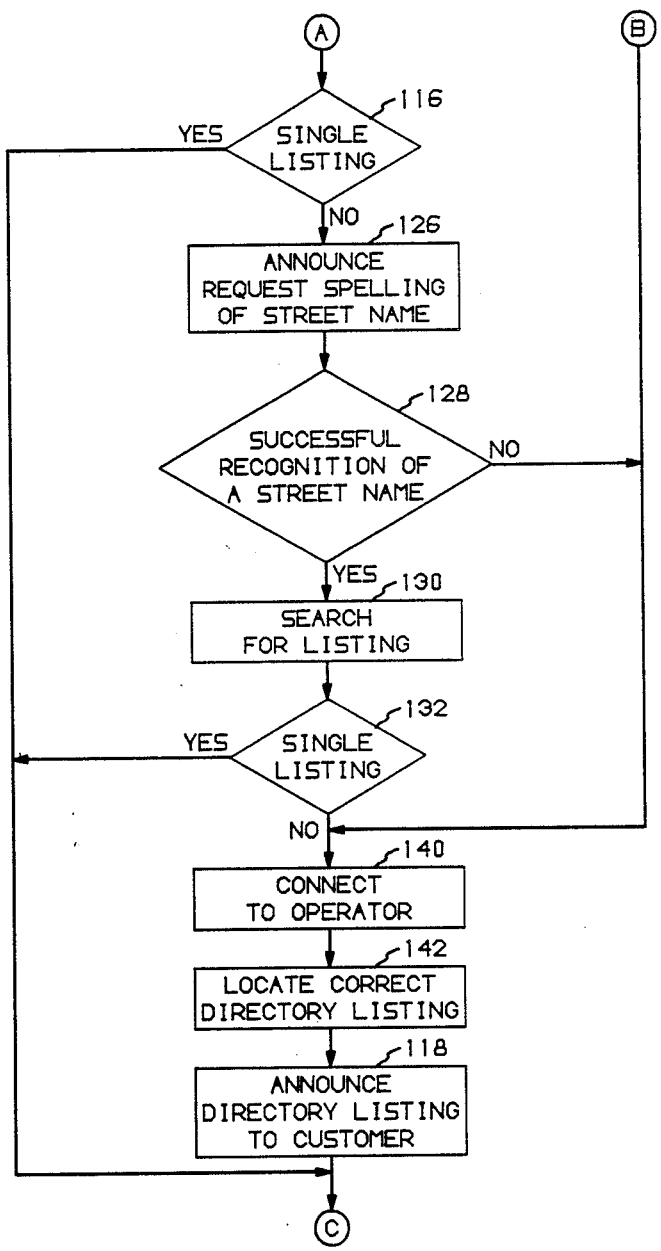
Figure 4:
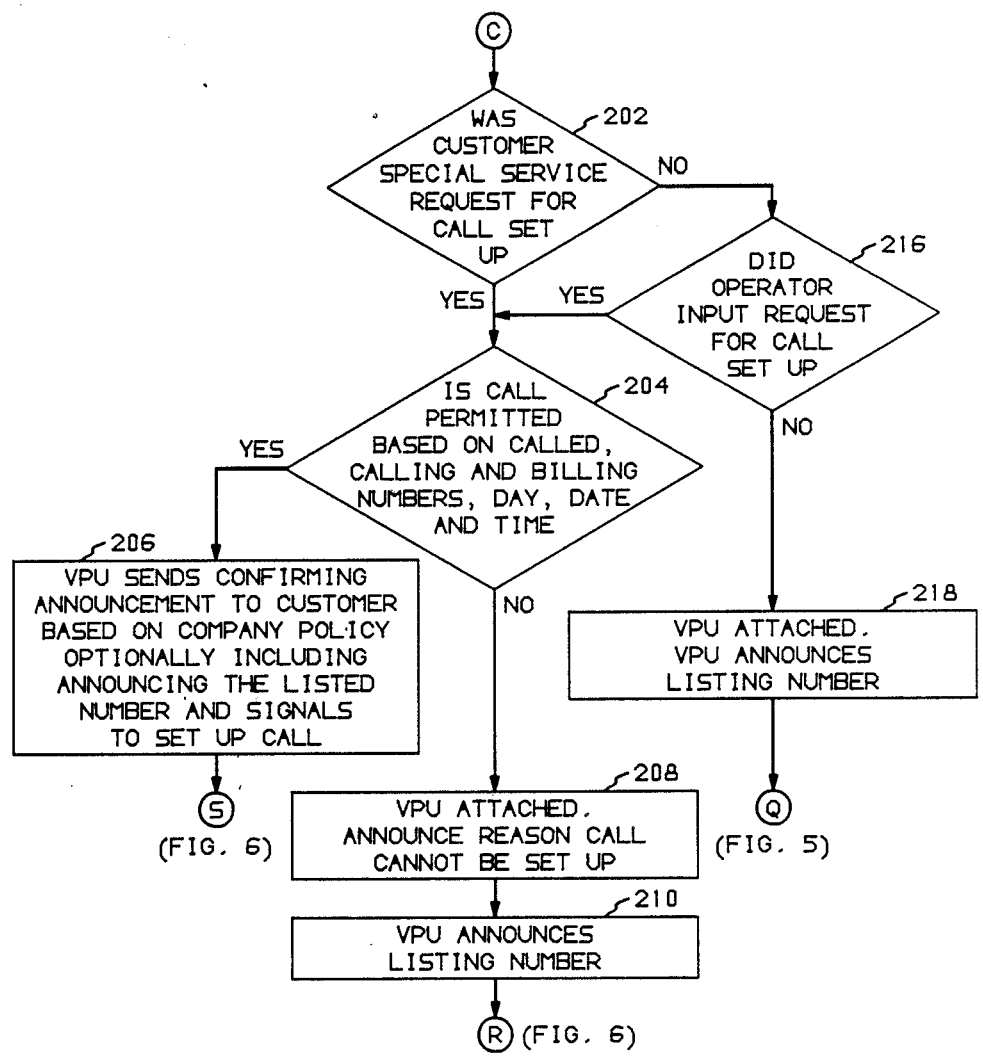

If test 108 described above does not indicate a successful recognition of a legitimate city name or zip code ("no" output of test 108), then the call is connected to an operator (action block 140, FIG. 3). The operator communicates with the caller and the directory assistance computer 56 using DAS/C terminal 52 and data link 54 for the latter communications. When a correct directory listing has been obtained (action block 142) then this listing is announced to the caller (action block 118). The listing is announced by audio response unit 60 which receives the directory number from DAS/C computer 56 over data link 58. Subsequently, the actions of FIG. 4 are performed, starting with test 202.

If the result of test 116 (FIG. 3) indicates a plurality of listings ("no" output of test 116) then VPU 14 announces a request for the spelling of the street name of the requested directory listing (action box 126). If there is a successful recognition of a legitimate street name ("yes" output of test 128) then a search is made for a listing (action block 130). If only a single listing is found ("yes" output of test 132) then that listing is announced (action block 118, previously described). If the street name is not successfully recognized ("no" output of test 128) or multiple listings exist for the name and street name provided ("no" output of test 132), then the call is connected to an operator (action block 140) and the actions previously described for directory assistance calls processed by an operator are performed.

The above scenario of announcements and responses is only one of a large number of possible arrangements which would be obvious to those skilled in the art of human factors man/machine interactions and the capabilities of speech recognition systems. For example, it may be desirable to allow for a repetition of announcements described in action blocks 106 and 110. The zip code requested in test 106 could be keyed by the customer using a DTMF customer terminal. For cases in which a plurality of listings are found and it is known that one of these listings is the most commonly requested, an announcement could be synthesized to ask the customer to respond "yes" or "no" whether the customer wants that directory listing. If a particular directory assistance system only serves one city, then the announcement requesting the customer to spell out a city name or zip code may be eliminated.

Test 202 (FIG. 4) is performed after a listing has been found ("yes" output of test 116 or 132, or action box 142, FIG. 3) to check whether the customer made a special request for call setup. If so, then test 204 is performed to check whether an automatic call setup is permitted based on the calling, called, and billing numbers and the day, date, and time. The check based on calling, called, and billing numbers is to ensure that the customer is authorized to incur charges for making the call. The day, date, and time is to check whether calls to that called number are permitted at this time. For example, a call to a large automatic call distribution system associated with a vendor may be closed on Sunday. If the call can be set up, the voice processing unit sends a confirming announcement to the customer indicating that the call will be set up and optionally including an announcement of the listed number. The option is based on the policy of the telephone company whether on calls of this type, the number of the called customer should be announced. For example, if the call is to a major business it may be telephone company policy not to announce the listed number since the customer could have requested such a number by making a conventional directory assistance request.

If the call is not permitted, then an announcement is sent announcing the reason why the call cannot be set up (action block 208) and the voice processing unit further announces the listed number (action block 210) so that the customer can dial the call if required.

If the customer did not make a special service request, a test is made (test 216) to see if an operator made a request for automatic call setup. If the operator made this request, then decision block 204 to test whether the call is permitted is entered and the actions discussed above are performed. If the operator did not request call setup, then a voice processing unit is attached to the connection and the voice processing unit announces the directory listing (action block 218).

Thereafter a test is made again to see whether the switch provides the call set up option for the announced telephone number (FIG. 5, test 224). Test 224 is used for those cases in which the customer did not initially request the call set up but simply requested a directory listing. If the switch does provide the call setup option, then a test is made (test 227) to check whether the call is permitted based on the calling, called, and billing numbers and the day, date, and time. This test is similar to test 224 described previously. If the call is permitted, then an announcement is sent to the customer such as: "Would you like this call set up to that number, 'yes' or 'no'" (action block 228). The customer's response is analyzed (decision block 230). If the customer responds "no" or makes no response as detected by a timeout (action block 232), then the actions shown on FIG. 6 to test whether the customer wishes to be reconnected to an operator are performed. These actions are also performed if the output of test 224 indicates that the switch does not provide an option for calls set up to the announced telephone number or if the call is not permitted (as found by test 227). If the customer indicates by saying "yes" that the customer wants the call set up following the announcement of action block 228, then a voice processing unit sends a confirming announcement to the customer and signals control 10 to take the actions for setting up the call (action block 236). The subsequent actions are described in action block 260, FIG. 6. If, following the announcement of action block 228, customer keys a zero, then the customer will be reconnected to an operator (action block 254, FIG. 6).

FIG. 6 is a flow diagram of actions to determine whether a customer wishes to be reconnected to an operator. The voice processing unit sends an announcement to the customer: "Would you like to speak to an operator now, 'yes' or 'no'" (action block 250). The customer's response is analyzed in decision block 252. If the customer says "no" or gives no response within a timeout interval (action block 258), the customer is disconnected (action block 259). If the customer says "yes", presses the zero button on a DTMF station, or says something else other than "no", an operator is connected (action block 254). The operator would have a display indicating the listing which had been announced to the customer and the information that the operator had entered into the DAS/C computer to retrieve that listing. After further verbal exchanges with the calling customer, the operator would then select and signal to control 10 (decision block 256) whether to disconnect the customer (action block 259), or to set up the call (action block 260) to the number obtained from the previous data base access. The call is set up over the interconnecting network 32 using standard arrangements and a record of the call, for billing purposes, is made using transaction recorder 22.

In accordance with the present invention, if the requested directory number is unpublished, i.e., not available to the operator and not listed in a telephone directory available to customers, and the customer requests an emergency connection at the time of the reconnect, the operator may select a third alternative action (decision block 256). The operator may signal a request to set up a three-way call between the calling customer, the customer associated with the unpublished number, and the operator (action block 257). The operator remains on the connection to ensure that the emergency is being communicated. However, neither the operator nor the calling customer is informed of the unpublished number, which thereby remains private.

A voice processing unit can recognize commands represented by the tones generated by a dual tone multifrequency (DTMF) customer station. For example, key 9 (which includes the letter Y for "yes") and key 6 (which includes the letter N for "no") can be used as alternatives to oral "yes" and "no" indications. In that case, the system responds to such tones keyed by the customer in the same way as it responds to a spoken "yes" or "no".

While this exemplary embodiment has shown a directory assistance system that is part of a local switching system, a directory assistance system such as the one described could also be a part of a private branch exchange (PBX) or a local switch serving a business. Similarly, the directory assistance system could be totally separate.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In a common carrier telecommunications switching network, a method of setting up a call connection comprising the steps of:
   dialing a number, different from a standard directory assistance number, from a calling customer station for requesting that a call connection be established from said calling customer station to a destination, said destination to be identified by a directory listing specified from said calling customer station;
   receiving from said calling customer station in an automatic speech recognition unit speech signals conveying information for identifying said directory listing comprising a directory number;
   generating data signals representing speech signals recognized by said automatic speech recognition unit from said received speech signals;
   responsive to said data signals, searching a data base for a directory listing, comprising a directory number, corresponding to said data signals; and
   if said searching step finds a unique directory listing corresponding to said data signals, transmitting a data message to a switching office of said network for causing said common carrier network to establish a connection between said calling customer station and a destination identified by said directory number.

2. In a common carrier telecommunications switching network, a method of setting up a call connection comprising the steps of:
   dialing a number, different from a standard directory assistance number, from a calling customer station for requesting that a call connection be established from said calling customer station to a destination, said destination to be identified by a directory listing specified from said calling customer station;
   receiving from said calling customer station in an automatic speech recognition unit speech signals conveying information for identifying said directory listing comprising a directory number;
   generating data signals representing speech signals recognized by said automatic speech recognition unit from said received speech signals;
   responsive to said data signals, searching a data base for a directory listing, comprising a directory number, corresponding to said data signals;
   if said searching step does not find a unique directory listing corresponding to said data signals, establishing a connection in said common carrier network between said calling customer station and an operator position for providing operator assistance in locating said directory listing; and
   if said searching step finds a unique directory listing corresponding to said data signals, transmitting a data message to a switching office of said network for causing said common carrier network to establish a connection between said calling customer station and a destination identified by said directory number.

* * * * *